Aug. 28, 1934.　　　　　E. BURGAN　　　　1,971,702
AUTOMOBILE WHEEL GAUGE
Filed March 6, 1934　　　2 Sheets-Sheet 1

INVENTOR
EDWARD BURGAN
BY
ATTORNEY

Aug. 28, 1934.  E. BURGAN  1,971,702
AUTOMOBILE WHEEL GAUGE
Filed March 6, 1934   2 Sheets-Sheet 2
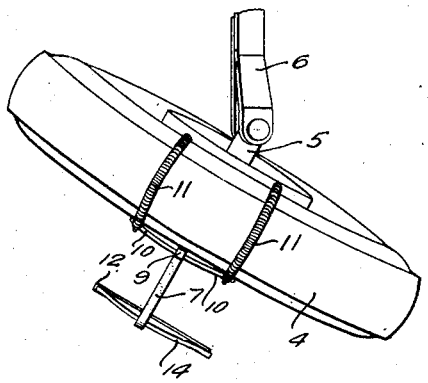
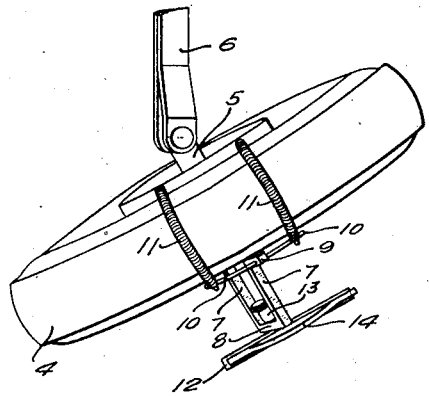
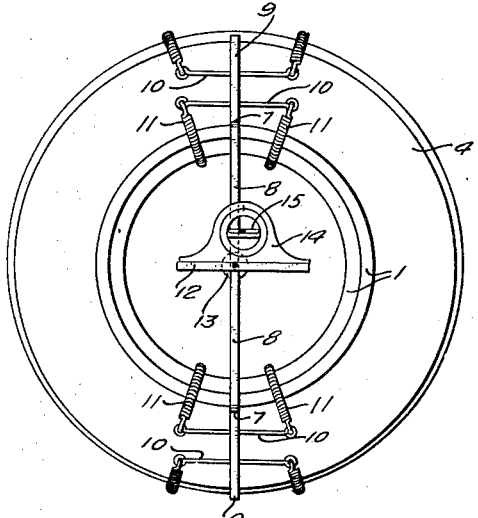
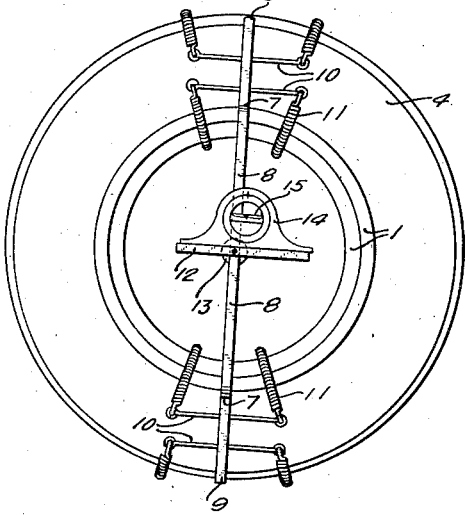
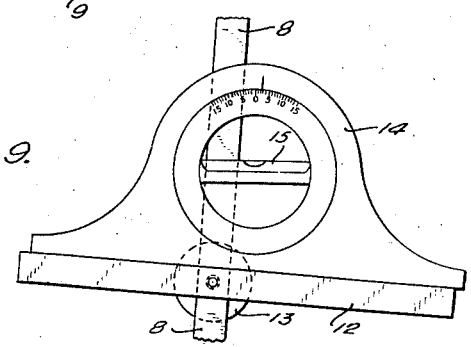
INVENTOR
EDWARD BURGAN
BY
ATTORNEY Patented Aug. 28, 1934

1,971,702

UNITED STATES PATENT OFFICE 1,971,702

AUTOMOBILE WHEEL GAUGE

Edward Burgan, White Plains, N. Y.

Application March 6, 1934, Serial No. 714,264

5 Claims. (Cl. 33—203)

This invention relates to a device for measuring the camber and caster of automobile wheels. Automobile front wheels are manufactured with a certain definite angle of camber in order to permit smooth running. The camber consists in tilting of the stub axle on which the wheels turn, causing the bottom of the two front wheels to be nearer together than the tops. In order to provide straight steering and to prevent transmission of road shocks to the steering wheel, the king pins about which the wheel axles rotate are tilted fore and aft, in order to provide a definite castering effect which causes the automobile to tend to proceed in a straight line and to recover from turns.
The exact angle of camber and caster are important and are carefully calculated for each automobile. Any departure from the correct angles results in hard steering, excessive tire wear, or both. Accidents frequently result in bending or twisting of the front axle of automobiles or of the parallelogram rods in independently sprung front wheels, and when such bent axles are repaired, it is necessary to determine accurately that the camber and caster are restored to their respective angles.

In the past, various devices have been proposed for measuring camber, depending on applications of plumb lines. Other devices have been proposed for measuring caster and certain devices have also described the measuring both of camber and caster. These latter devices may be classified in two general classes, those in which the angularity of the wheel in two planes is measured with respect to a vertical rod which is provided with a base and rests on the floor, and a second class which clamp on the wheel and depend on the measurement of angle of a vertical rod affixed to the end of the stub axle in the hub. Both classes of device are very delicate and depend for accuracy absolutely on the perfectly true vertical alignment of a rod. Anything which throws off this alignment likewise upsets the readings obtained, which are read from the end of the vertical rod. When used in the ordinary garage, such gauges are frequently subject to rough usage and rods may easily become bent. Similarly, floors are not always perfectly level and in the class of device depending on measurement from a vertical rod, held by a stand resting on the floor, this introduces a further source of error. The devices in the prior art are in many cases complicated and expensive to construct, which increases their cost and greatly decreases their field of usefulness because devices of this type are not used very frequently by any one garage, and many garages, therefore, cannot afford the high cost of complicated gauges which are used only occasionally.

According to the present invention, a simple, cheap gauge measures both camber and caster with great accuracy and the measurement is absolutely independent of the gauge frame, thus the gauge may be bent and twisted to a degree which would make readings on the ordinary type of gauge entirely inaccurate, without introducing any inaccuracy in the determination of either camber or caster. The present invention depends for its operation on the application of a spirit-level to a plane surface, which is adjusted to constitute a prolongation of the stub axle for measuring camber or a surface at right angles thereto for measuring caster. Essentially the present invention comprises a frame which may advantageously be of metal, attached to the wheel at two opposite points on its periphery, with a rotatable straight edge which can be positioned to form a prolongation of the stub axle or to form a plane at right angles thereto. The framework of the gauge serves only the purpose of aligning the straight edge with the axle. The shape and inclination of the component parts of the frame plays no part in the operation of the gauge because the latter rotates about a point opposite the end of the axle and any movement of the wheel about this point will result in a movement of the straight edge which is not influenced by the shape of the frame, the latter having only one function of rigidly aligning the point about which the straight edge turns with the prolongation of the axle. It will be obvious that since the accuracy of reading of the gauge is in no way determined by the shape of the frame, the latter may become bent through accident or through ordinary use without in any way affecting the accuracy of readings of the gauge. Moreover, since it is not necessary to provide a rigidly aligned vertical rod, the gauge frame may be of much lighter and cheaper metal, and an extremely economical design is available.

The invention will be described in greater detail in conjunction with the preferred construction of gauge illustrated in the drawings, in which Fig. 1 is a side elevation of an automobile wheel with the gauge applied;

Figs. 5 and 6 are top views of an automobile wheel with the gauge adjusted for measuring caster;

Figure 1:
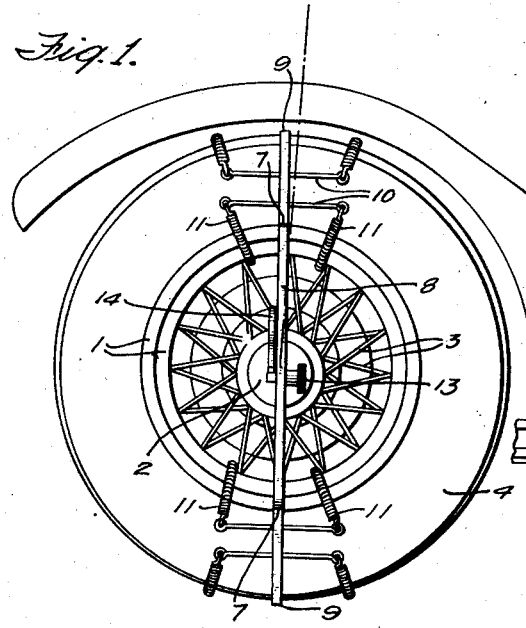
Figure 2:
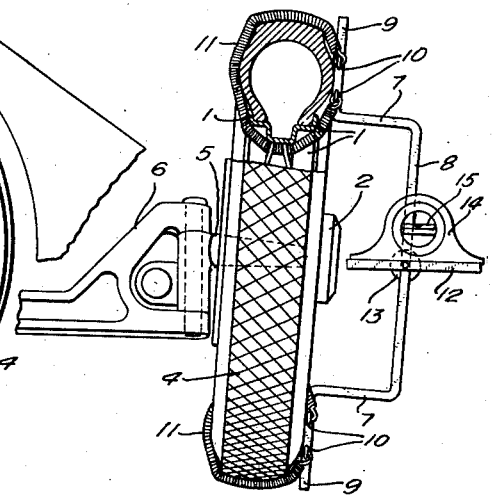
Fig. 2 is a front view partly in section of the same wheel, with the gauge adjusted for measuring camber.
Figure 3:
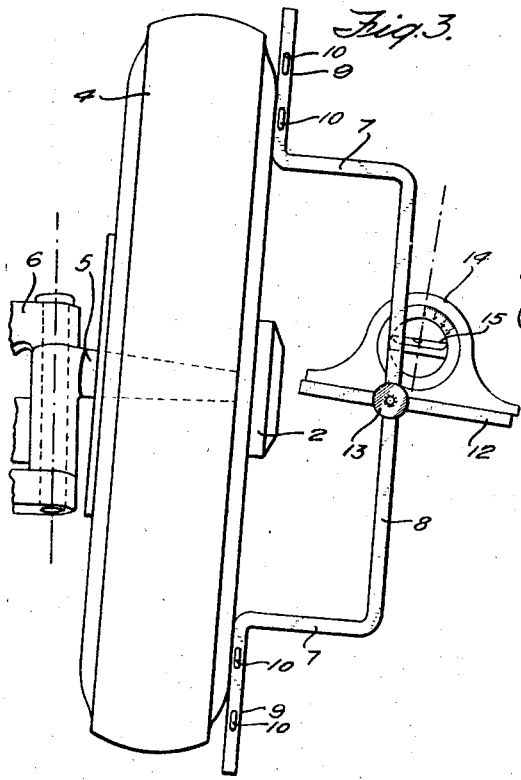
Figs. 3 and 4 are front elevations illustrating the gauge adjustment for final reading of camber.

Figs. 7 and 8 are side views of the wheel and gauge in the position shown in Figs. 5 and 6 respectively; and Fig. 9 is an enlarged detail of the gauge face.

In the figures, for the sake of simplicity, only an automobile wheel and such portion of the axle as is necessary for clarity is shown, and similarly in order to make the operation of the invention more clear, the illustration is taken from an automobile provided with two wheel instead of four wheel brakes. Additional structures involved in the four wheel brake will not in any way affect the operation of the gauge but make the drawings more complicated and less clear.

The wheel in Figs. 1 to 4 is a wire wheel with rim 1, hub 2, spokes 3 and a tire 4. A stub axle 5 runs through the hub and is fastened into a front axle 6 by the formally conventional Elliot type of mounting. The gauge consists of a frame 7 which is bent to give a straight portion 8 with two L-shaped bends 9 at either end to contact with the tire. In order to assure of firm contact, the frame portions 9 are drilled and light round metal rods 10 (see Fig. 1) are firmly fastened therein. Adjustable coil springs 11 clamp the rods 10 firmly against the tire. In the centering of the portion 8 of the gauge frame, there are two holes at right angles to each other, and a straight edge 12 is pivoted on a bolt passing through one of the holes in the frame 8. The bolt may be provided with a knurled fastening knob 13.

Figure 4:
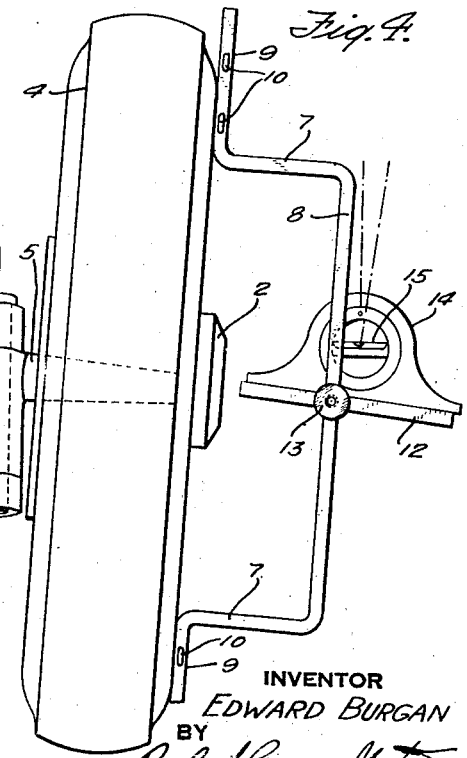

In measuring camber, as illustrated in Figs. 1 to 4, the straight edge is pivoted about a bolt in the hole at right angles to the front axle and the frame is moved on the tire so that the pivot of the straight edge is exactly opposite the center of the hub and may, therefore, be considered as a point on a line drawn from the center of the hub parallel with the ground. The location of the straight edge can be effected very accurately by sighting along it. After location a protractor level 14 is set with its level frame 15 at zero on the scale (see Figs. 2 and 3). The straight edge 12 is then moved until it is exactly level and is then locked in its position by tightening the knob 13. The level protractor is then removed and the wheel turned through an angle of 180 degrees (Figs. 3 and 4), the set screw on the level protractor frame is loosened, the level applied to the straight edge 12 (Fig. 3) and then the level frame turned until the leveling bubble is exactly in the center (Fig. 4). The angle through which the frame has been turned is then read off and is equal to twice the angle of camber. For convenience, level protractors used in the present invention may be provided with a scale reading half angles so that the scale reading will give the angle of camber directly.

It will be obvious that once the pivot of the straight edge is located at the opposite end of the hub cap, it retains this position during rotation of the wheel, irrespective of the angle which the straight portion 8 makes with the plane of the wheel. In other words, this portion of the gauge does not have to be parallel with the wheel or have any particular relation therewith since it serves purely as a frame to locate the straight edge pivot, and as the latter is at the center of rotation, it remains in the same relative position with regard to the wheel during rotation. Therefore, if the gauge frame becomes bent through accident or ordinary use, the accuracy of readings is in no way affected.

The drawings show a straight edge and detachable level protractor. This is the simplest form of the present invention and it is the preferred form as it permits the utilization of level protractors which are produced as a standard article and requires no special instrument. Moreover, the level protractor which is the only delicate part of the whole gauge is not subject to shocks if the gauge frame is dropped on the floor, as frequently happens when it is being removed from a wheel. The operation of the present invention, of course, depends in no way on the use of a detachable level protractor and the same may, of course, be incorporated integrally with the straight edge, in which case, of course, it is turned up-side-down by rotation of the wheel from the position in Fig. 2 to the position in Fig. 3 and this makes reading of the protractor scale more difficult, which is an additional reason why a detachable level protractor presents advantages.

In order to measure caster as shown in Figs. 5 to 8, the straight edge 12 is pivoted about the second hole in the frame 8, that is, about a pivot which is on a line from the hub of the wheel. The gauge frame is moved slightly so that this second hole is exactly opposite the center of the hub and then the steering wheel is turned so that the wheel to be measured assumes one extreme position as shown, for example, in Fig. 5 on the left front wheel, the extreme right position. The level protractor is again set to zero, applied to the straight edge 12 and the latter turned about its pivot until it is level, whereupon the adjustment is locked by tightening the knob 13 and the steering wheel is then turned until the wheel is in its opposite extreme position, which is shown in Fig. 6. The set screw on the protractor scale is then loosened, the protractor again applied to the straight edge, and it will be noted that it is now no longer level (Fig. 8). The level frame is then turned until it is again level and the angle read off (see Fig. 9). This is obviously twice the proportion of the angle of caster corresponding to the proportion between the angle through which the wheels are turned from one extreme position to the other at 180 degrees. Since various automobiles turn their front wheels more or less sharply, different readings will correspond to different angles of caster in particular cars and a chart of the proper readings for each model is, of course, calculated on the readings from the protractor level, which is converted into caster angles by the chart, or in the case of a gauge which is to be used as a production gauge or for service of only one make of car, a special scale may be provided on the level protractor to read directly in caster angles.

As the protractor reads an angle variation which is caused by departure of the king-pin from the perpendicular, theoretically the reading should be affected by king-pin inclination in the plane of the axle as well as by caster which is inclination normal to said plane. However, as the wheel turns through the straight-ahead position, the angle due to king-pin inclination passes through zero. Therefore, the effect of king-pin inclination on protractor reading of rotation of the wheel through an angle from straight-ahead to maximum forward angle will cancel the effect of the inclination for a corresponding angle from straight-ahead toward maximum rear angle. If the wheels were turned through the same angle from straight-ahead to maximum forward as to maximum rear, the effect of king-pin inclination would be entirely neutralized. In practice, of course, the maximum rearward angle is slightly greater owing to the fact that the inside wheel on a turn rolls along a circle of smaller radius and therefore has to be more sharply turned from the straight-ahead position than when the wheel is an outside wheel on a turn in the opposite direction. There is therefore a slight effect due to king-pin inclination but as this is only due to the difference between maximum forward and maximum rear angle, it is relatively very small compared to the total angle through which the wheel is turned from one extreme position to the other. Small though this effect may be, it is of course compensated for in charts for any given car.

It will be apparent that the present invention does not depend for its accuracy on anything but the inherent accuracy with which the level protractor can be read. It makes no difference if the frame of the gauge is bent, and since the gauge is not attached to the hub or axle, it makes no difference whether the gauge frame is at right angles to the hub or not. Rough handling and abuse, short of complete destruction of the gauge frame, in no way destroys its usefulness. The level protractor in the preferred embodiment can be kept separate from the gauge except during actual use and is protected from shocks or other injury. The reading of the gauge is simple and because of the fact that the level protractor locks in its various positions, it is possible to remove the protractor from the straight edge and read its scale at a point removed from the gauge frame. This is of considerable importance because the gauge when attached to the straight edge is not at eye level and most accurate reading is obtained when the protractor level is taken to a place with good light and is read in a comfortable position.

The drawings show an extremely simple type of construction, and for many purposes this is the best. To change from measuring camber to caster, it is, however, necessary to unscrew the knob 13 and to pass the bolt through the second hole. Where it is desired to avoid this slight delay, any suitable arrangement whereby the pivot for the straight edge can be turned through 90 degree angle, can be employed.

A very simple type of attachment to the wheel is shown in the drawings. Any other suitable means can be employed, and does not affect the operation of the invention. It is a further advantage of the invention that special clamping means are unnecessary for accommodating the gauge frame to different sizes of wheels as any flexible spring attachment such as that illustrated in the drawings can be used with wheels of widely varying diameters.

I claim:

1. A wheel gauge for automobile wheels comprising in combination a rigid gauge frame, means for temporarily attaching said frame to the outer side of a wheel or tire at two opposite points, said attaching means being sufficiently flexible to permit adjustment of the position of the frame, an axle journaled in said frame and adapted to be aligned with the center of the wheel hub, a straight edge rotatable about said axis and a level protractor adapted to measure departures from the horizontal of said straight edge and means for locking the straight edge against rotation.

2. An automobile wheel gauge comprising a framework having a center section and two L-shaped end sections bent at right angles thereto, means for attaching the end sections to the side of an automobile tire or wheel at opposite ends whereby the center section of the frame projects beyond the plane of the wheel, an axle journaled in said center section at its central point and adapted to be aligned with the center of the wheel axle by movement of the frame, and a straight edge rotatable about said axle, a level protractor adapted to co-operate with said straight edge and to measure its inclination to the horizontal and means for locking the axle against rotation.

3. A gauge for measuring both camber and caster of automobile wheels, comprising in combination a rigid frame, means for attaching the frame to the periphery of a wheel or tire at opposite points, a straight edge rotatable about an axle and means for journalling said axle in said frame in either of two positions, one parallel to the plane of the wheel and the other at right angles thereto, the attaching means for the frame permitting sufficient adjustment to align the journaled axle with the center of the wheel hub, a level protractor adapted to co-operate with the straight edge to measure its inclination to the horizontal and means for locking the axle against rotation.

4. An automobile gauge for measuring both caster and camber, comprising in combination a rigid frame consisting of a center portion and two L-shaped end portions bent at right angles thereto, means for attaching the end portions to the side of a wheel or tire, whereby the center section of the gauge frame projects beyond the plane of the wheel, and an axle journaled in said center section and adapted to assume a position parallel to the plane of the wheel or at right angles thereto, the attaching means of the framework permitting adjustment thereof to align the axle with the center of the wheel hub, a straight edge rotatable about said axle, a level protractor adapted to co-operate with said straight edge to measure its inclination to the horizontal, and locking means to prevent rotation of the axle.

5. An automobile wheel gauge for measuring both caster and camber, comprising in combination a rigid gauge frame having a center section and two L-shaped end sections bent at right angles thereto, means for attaching the end sections to the side of an automobile wheel or tire whereby the center section of the frame projects from the plane of the wheel, two holes at right angles to each other at approximately the center of the center section of the frame, the frame attaching means permitting sufficient movement to align either one of the holes with the center of the wheel hub, a bolt and locking knob or nut adapted to be successively introduced into the holes in the frame, a straight edge journaled on said bolt and adapted to rotate around the bolt as an axis, and a level protractor co-operating with said straight edge to measure its inclination to the horizontal.

EDWARD BURGAN.